United States Patent [19]
Kreucher et al.

[11] Patent Number: 5,749,223
[45] Date of Patent: May 12, 1998

[54] EXHAUST MANAGEMENT SYSTEM

[75] Inventors: John Eric Kreucher, Davison; Barry Odell Christenson, Fenton; Roger Kurt Starke, Swartz Creek; Stephen Joe Myers, Owosso; John Arthur Horton, Clio, all of Mich.

[73] Assignee: General Motors Corporation, Detroit, Mich.

[21] Appl. No.: 611,944

[22] Filed: Mar. 6, 1996

[51] Int. Cl.[6] .................................................. F01N 3/28
[52] U.S. Cl. ............................ 60/300; 60/303; 422/174
[58] Field of Search ........................ 60/300, 284, 303; 422/174; 392/485

[56] References Cited

U.S. PATENT DOCUMENTS

| | | | |
|---|---|---|---|
| 1,716,481 | 6/1929 | Bilsky | 60/300 |
| 5,164,155 | 11/1992 | Abe et al. | 422/174 |
| 5,202,548 | 4/1993 | Kondo et al. | 60/300 |
| 5,245,825 | 9/1993 | Ohhashi et al. | 60/300 |
| 5,296,198 | 3/1994 | Abe et al. | 60/300 |
| 5,444,976 | 8/1995 | Gonze et al. | 60/303 |
| 5,526,462 | 6/1996 | Kondo et al. | 392/485 |

FOREIGN PATENT DOCUMENTS

| | | | |
|---|---|---|---|
| 15421 | 1/1989 | Japan | 60/300 |
| 31510 | 2/1991 | Japan | 60/300 |
| 263627 | 10/1993 | Japan | 60/300 |

*Primary Examiner*—Willis R. Wolfe
*Attorney, Agent, or Firm*—Anthony Luke Simon

[57] ABSTRACT

An exhaust management system comprising a catalytic converter having a catalyst operative to reduce HC emissions from a flow of exhaust gas from an automotive internal combustion engine when the catalyst is above a light-off temperature and a heater assembly mounted in the flow of exhaust gas, upstream of the catalyst and exterior of the catalytic converter, wherein the heater assembly includes an electric heater located more than one inch from a front surface of the catalyst.

6 Claims, 7 Drawing Sheets

EXHAUST MANAGEMENT SYSTEM

This invention relates to an exhaust management system.

BACKGROUND OF THE INVENTION

In certain catalytic converter systems, it may be desirable to include an auxiliary heater useful at engine start-up to decrease the amount of time it takes for the catalytic converter catalyst to reach light-off temperature. In one known example, an electric heater, such as a resistively heated honeycomb structure, is placed in the exhaust flow path immediately preceding or upstream of the catalytic converter, within one inch of the front surface of the catalyst. The honeycomb structure transfers heat to the exhaust gas as it flows through the heater. After passing through the heater, the exhaust gas flows directly to the catalytic converter catalyst, where it transfers heat from the engine and from the electric heater to the catalyst to bring the catalyst up to light-off temperature. Such electric heaters are available for sale, for example, from NGK, Japan. The close placement of the electric heater to the catalyst (i.e., one inch or less) is thought necessary to affect efficient heat transfer from the heater to the catalyst.

In one known example, the electric heater includes a series of arcuately spaced legs around the radial exterior of the honeycomb structure that are welded to the converter shell to maintain the heater in place.

In another known type of catalytic converter system, a heater is integrated into a catalytic converter catalyst and directly transfers heat to the catalyst. The heater may either be in the main catalytic converter catalyst, in a light-off catalyst within the catalytic converter, or within a light-off catalyst mounted in a housing separate from the main catalytic converter upstream of or parallel to the main catalytic converter. Typically the light-off catalyst has a volume of at least ten cubic inches.

SUMMARY OF THE PRESENT INVENTION

It is an object of this invention to provide a heater assembly for a catalytic converter according to claim 1.

Advantageously, this invention provides an exhaust management system including an electric heater for a catalytic converter catalyst that is remote-mounted from the catalytic converter. Remote mounting the heater allows integration of the heater into the exhaust system without requiring extensive redesign of the catalytic converter.

Advantageously this invention provides an exhaust management system including a heater assembly for a catalytic converter catalyst implementable as a universal package applicable to a variety of catalytic converter systems.

Advantageously, according to a preferred example, this invention provides an exhaust management system comprising a catalytic converter having a catalyst operative to reduce HC emissions from a flow of exhaust gas from an automotive internal combustion engine when the catalyst is above a light-off temperature and a heater assembly mounted in the flow of exhaust gas, upstream of the catalyst and exterior of the catalytic converter, wherein the heater assembly includes an electric heater located more than one inch from a front surface of the catalyst. According to this invention, the heater assembly is free of catalyst substrates and no catalyst substrates are located between the heater and the front surface of the catalyst.

According to this invention, while the heater is placed more than one inch upstream of the catalyst, the performance obtained is comparable to that achieved in prior art systems in which the heater is incorporated into the catalytic converter immediately adjacent the catalyst.

Advantageously, according to another preferred example of this invention, the electric heater includes a heated honeycomb flow director for transferring heat to exhaust gas flowing through the honeycomb flow director and the heater assembly includes a housing defining a tubular flow passage having an inlet end, an outlet end, an inner tubular wall and a mounting section on the inner tubular wall, wherein the inner tubular wall has a first diameter at the mounting section and a conical section between mounting section and the inlet end, wherein the inlet end of the tubular wall has a second diameter unequal to the first diameter at the mounting section, wherein the outlet end has a mount suitable for attachment to a conventional catalytic converter.

BRIEF DESCRIPTION OF THE DRAWINGS

The present invention will now be described, by way of example, with reference to the following drawings, in which.

DETAILED DESCRIPTION OF THE INVENTION

Figure 1:
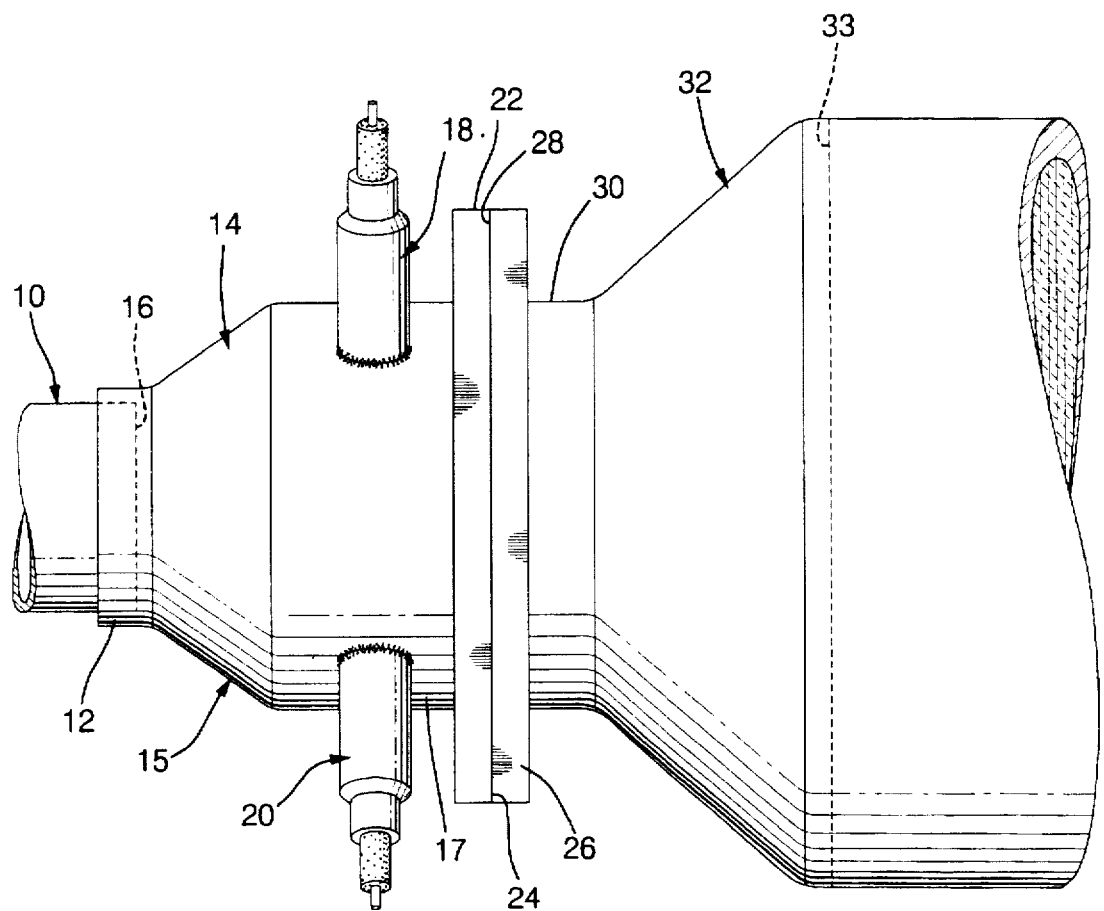
FIG. 1 illustrates part of a vehicle exhaust management system according to this invention.

Referring now to FIG. 1, the down pipe 10 from an engine manifold (not shown) has an end 16 that fits within and is welded or clamped to end 12 of flow tube 14 defining a tubular passage for heater assembly 15. At the second end 17 of heater assembly 15, mounting plate or flange 22 is welded to the flow tube 14. An electrically powered heater (not shown in FIG. 1) is mounted within heater assembly 15 for heating exhaust gas passing through the heater assembly 15. Electricity is provided to the heater through electrodes 18 and 20, which pass through and are securely welded to the flow tube 14.

Flange 22 has a planar surface 24 facing and mating against planar surface 28 of complementary flange 26, which is welded to the inlet 30 of catalytic converter 32. The planar surfaces 24 and 28 are perpendicular to the axis of the flow passage within flow tube 14.

During and after engine start-up, before the catalytic converter catalyst reaches light-off temperature, electric power is provided to the heater assembly 15 through electrodes 18 and 20 to heat the electric heater. Exhaust gas flowing out of the engine flows through the engine manifold (not shown) and the down pipe 10 to the heater assembly 15, where the electric heater adds heat to the exhaust gas. The electric heater itself preferably has a volume of less than five cubic inches and cannot itself function as a catalyst or light-off substrate (note: while the heater surface may be coated with precious metals for the purpose of additional heat output from exothermic reactions and while the high temperature of the surfaces of the electric heater may stimulate some reduction of undesirable exhaust gas species, the amount of reduction is negligible compared to the operation of the catalytic converter catalyst, therefore the heater is not included in the definition of catalyst or catalyst substrate). The heated exhaust gas then flows into the catalytic converter 32 where the exhaust gas transfers heat received from the engine and the heater assembly 15 to the converter catalyst to quickly bring the catalyst up to light-off temperature. The catalyst within the converter is the first catalyst substrate to which the exhaust gases are exposed. This contrasts to prior art systems in which the heater is integrated with a separate light-off catalyst upstream of the main catalytic converter or is integrated within the catalytic converter itself. Once the catalyst reaches and sustains light-off temperature, electric power to the heater assembly 15 is terminated.

The heater assembly 15 comprises a module mounted remote from the catalytic converter 32 with a universal mounting structure suitable for assembly to a variety of different converters without requiring extensive redesign of the converters. The heater assembly is easily mounted into the system by fastening the down-pipe to the remote unit 15, i.e., by welding or clamping, and by fastening the flange 22 to flange 28.

According to this invention, the heater, remote-mounted from the converter, is located further upstream from the catalyst than thought possible prior to this invention. Instead of the heater being within one inch of the converter catalyst, the heater is now located more than one inch upstream of the front surface 33 of the converter catalyst, which is the first catalyst in this system with which the exhaust gas makes contact. Typically, in example implementations of this invention, the heater will be located at least two inches upstream of the front surface 33 of the converter catalyst. Despite the large separation between the heater and the catalytic converter catalyst provided by the structure of this invention, the heater operates to quickly and efficiently bring the catalyst up to light-off temperature. These performance results are explained in further detail below with reference to FIG. 7.

Figure 2:
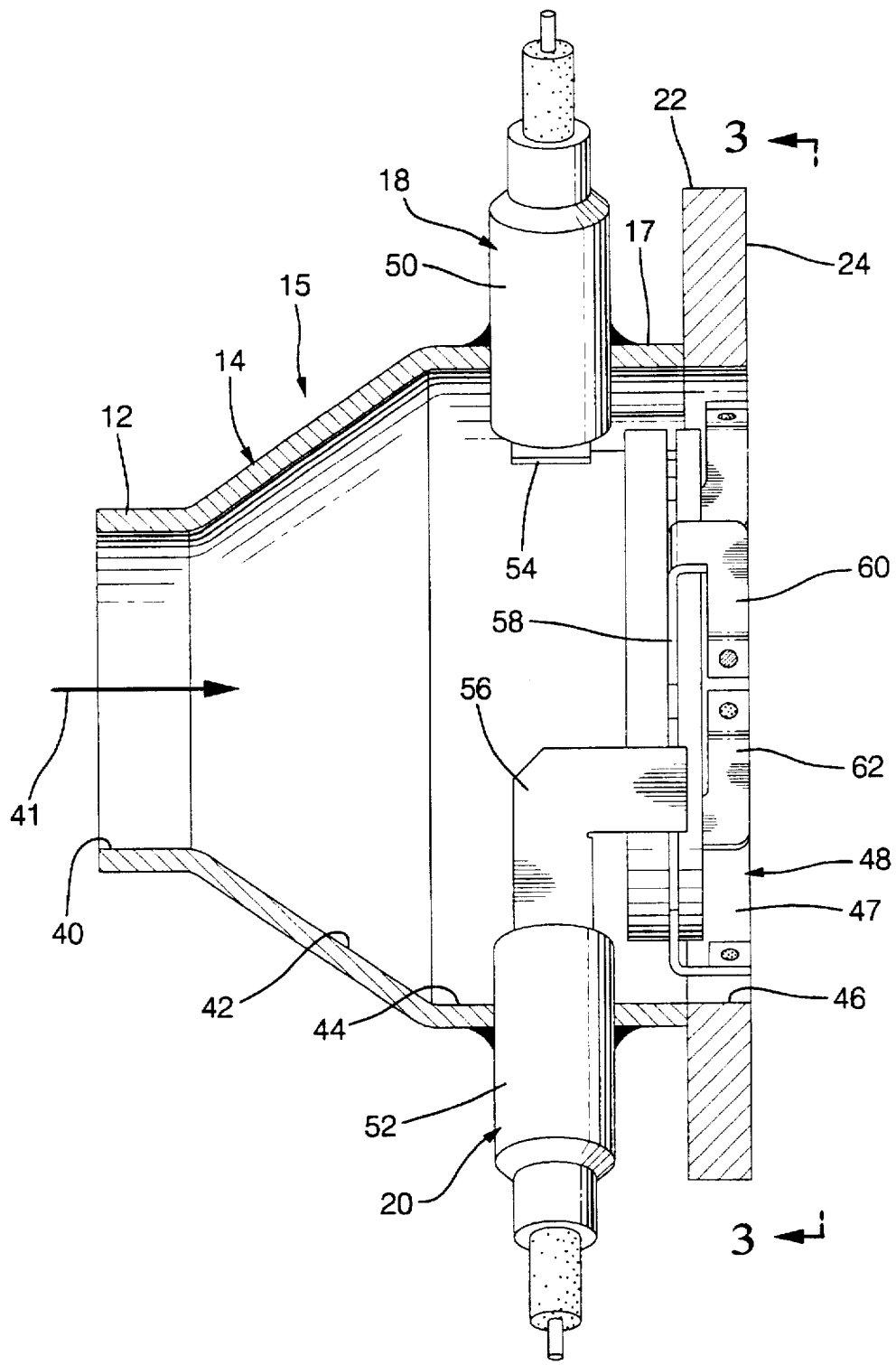
FIGS. 2 and 3 illustrate an example of a catalyst heater assembly according to this invention.
Figure 3:
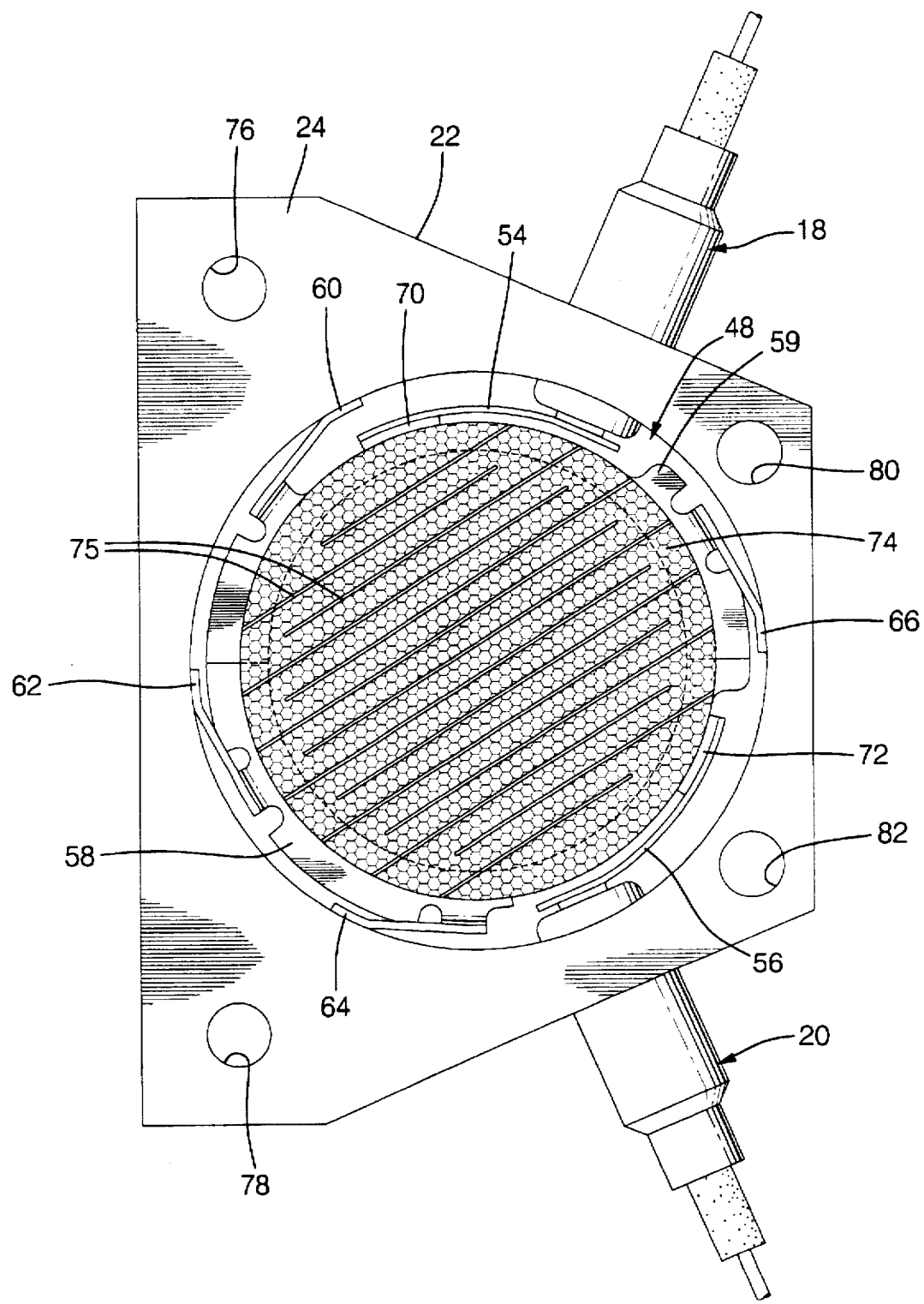

Referring now to FIGS. 2 and 3, a detailed example of the heater unit 15 is shown. The flow tube 14 has an inlet 40 at end 12 that, in the example shown, has a diameter smaller than the diameter at the outlet end 17 of the tube 14. The tube 14 has a conical expanding portion 42 that expands in a flow direction 41, expanding the diameter of the tube 14 to the diameter at section 44 leading to the outlet end 17 of the tube 14.

Electrodes 18 and 20 are welded into holes or slots pierced in the wall of section 44 of the tube 14. The electrodes 18 and 20 have body portions 50 and 52, respectively, that are electrically insulated from the electric current path within the electrodes providing power to the electric heater 48. The welds between the electrodes 18 and 20 and the tube 14 are made at the body portions 50 and 52 and completely circumscribe the body portions 50 and 52 where they interface with section 44 of the flow tube 14 to provide a sealed engagement between the electrodes 50, 52 and the flow tube 14.

Each electrode 18 and 20 makes electrical contact to a terminal 54, 56 that carries electricity from the electrodes 18 and 20 to the electric heater 48. The terminal 54 rests against contact pad 70 on one side of the electric heater 48 and the terminal 56 rests against contact pad 72 on the other side of the heater. The contact pads 70 and 72 provide the path of electricity from the terminals 54, 56 to the honeycomb mesh 74.

As can be seen in FIG. 3, the honeycomb mesh 74 of the heater 48 has a series of cuts 75 through the mesh creating a serpentine path for electricity through the heater increasing its impedance and electrical performance.

A majority of the heater 48 is suspended by the legs 60, 62, 64 and 66 upstream of the flange 22 so that the body of the heater 48 is located within flow tube 14.

Electric heater 48 is of a structure generally known to those skilled in the art and includes a honeycomb mesh flow director fabricated from or coated with a metal that is resistively heated to heat exhaust gas flowing through the heater assembly 15. On the outer periphery of the electric heater 48, flanges 58 and 59 extend in the radial direction over predetermined arcuate distances of the periphery of the heater. Out of the flange 58, three legs 60, 62 and 64 extend axially parallel to and in the same direction of flow through the heater assembly 15. Each of the legs 60, 62 and 64 has a distal end extending arcuately and radially outwardly to come into contact with the inner periphery 46 of opening 47 in the mounting flange 22. A similar leg 66 extends from flange 59. The terminating end of each leg 60, 62, 64, 66 is welded to the inner periphery 46, securing the heater 48 in place within mounting flange 22.

The heater 48 and its structure are not claimed as part of this invention and such heaters are available for sale, for example, from NGK, Japan.

In the example shown, mounting flange 22 includes four holes 76, 78, 80 and 82 suitable for receiving fasteners of a suitable type, i.e., bolts (not shown), for mounting the assembly 15 to mounting flange 26, having similarly placed holes for receiving the fasteners (not shown).

Figure 4:
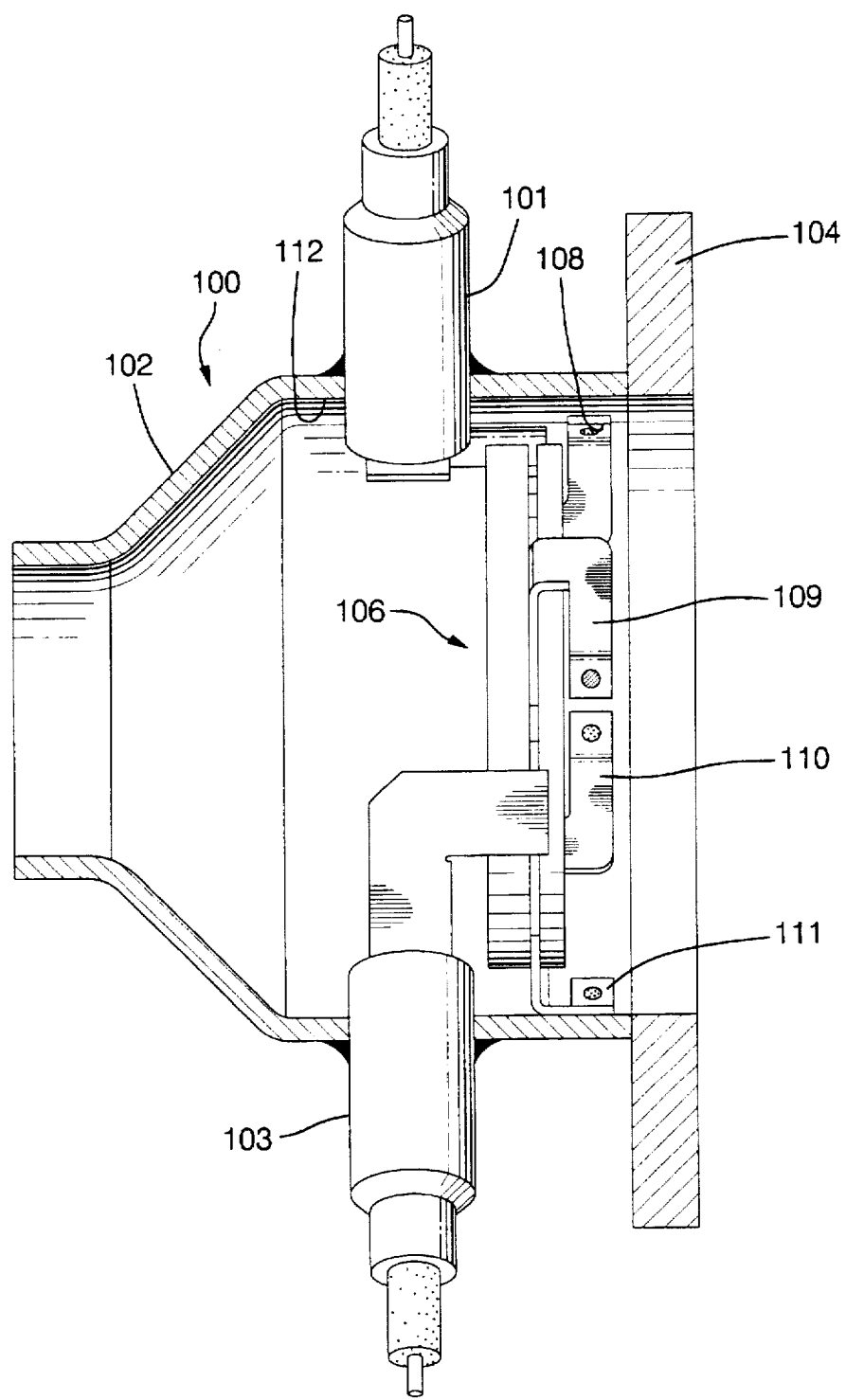
FIG. 4 illustrates an alternative example configuration for a catalyst heater assembly according to this invention.

Referring now to FIG. 4, the drawing shows an alternate example heater assembly 100. The assembly 100 includes flow tube 102 and flange 104. The electric heater 106, similar to the heater 48 in FIGS. 2 and 3, has legs 108–111 that are welded, in this example, to the interior surface 112 of the flow tube 102. The terminals 101, 103 are mounted to the flow tube 102 in a manner similar to the terminals 18, 20 in FIG. 2. This configuration makes flange 104 optional, to be included where it is desired to mate to a corresponding flange on the catalytic converter inlet or to be omitted when it is desired to either weld or clamp the tube 102 directly to the catalytic converter inlet.

Those skilled in the art will recognize that the above heater assembly examples provide advantages affecting easier implementation of an electric catalyst heater upstream of a conventional catalytic converter. For example, the flange provides a universal mounting structure capable of mating to any similarly shaped flange and the flow tube 102 has an inlet end that similarly acts as a universal mounting structure because it is sizable through known tubular sizing operations to various manifold down pipe diameters. As a result, this invention provides, in this example, a single heater assembly that can be made and sized to fit into a variety of systems. Thus, according to an example of this invention, an exhaust system with an electric heater upstream of a catalyst is provided in which a down pipe from an engine exhaust manifold may have a variety of diameters. The heater assembly is provided with a flow tube and the flow tube has an inlet end sizable to match the size of the down pipe and an outlet end, including a flange, adapted for mounting to a complementary flange at the inlet of the catalytic converter.

Figure 5:
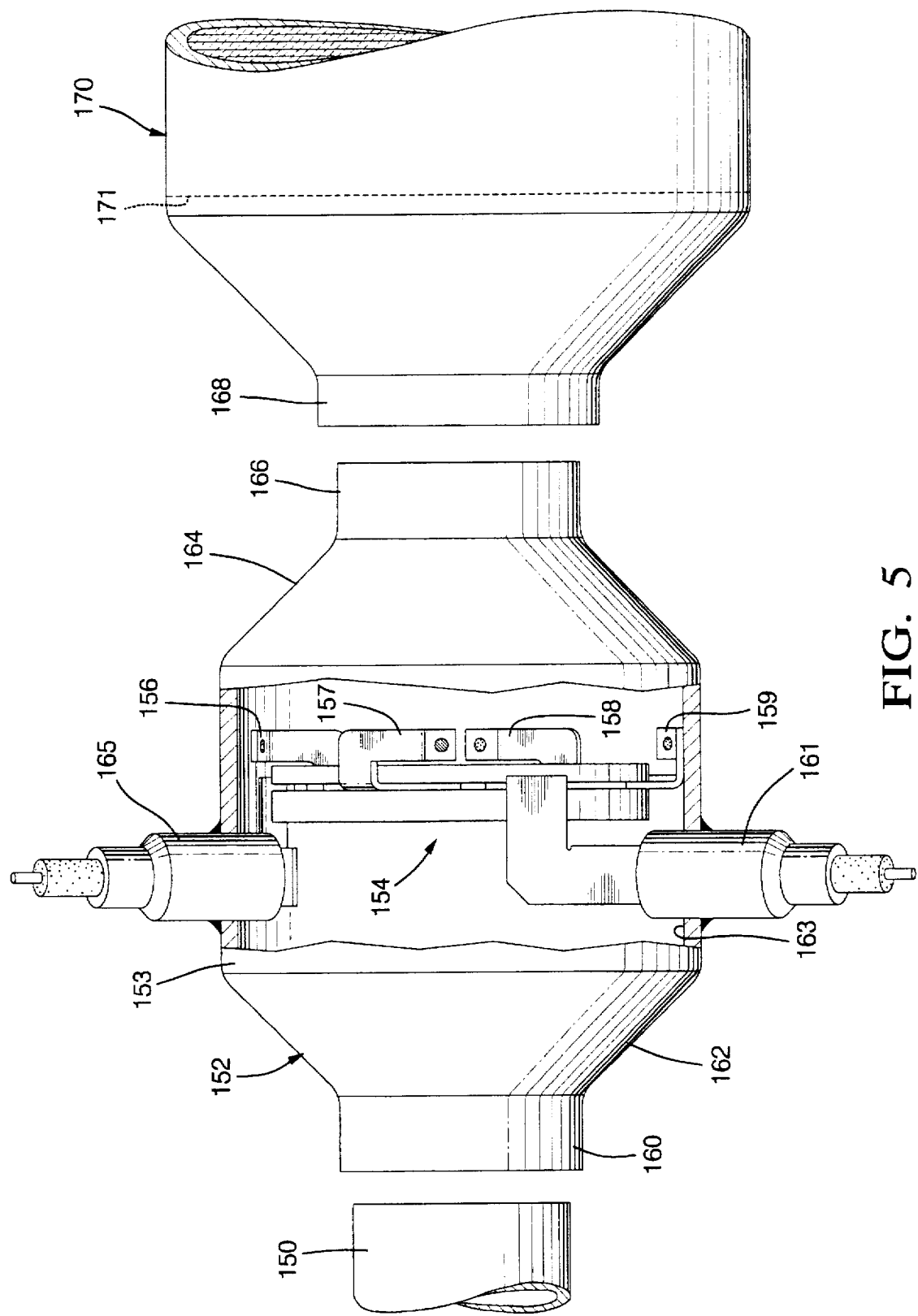
FIG. 5 illustrates another alternative example configuration for a catalyst heater assembly according to this invention.

Referring now to FIG. 5, the example exhaust system shown includes down pipe 150 carrying exhaust gas from an engine manifold. The heater assembly 152 comprises flow tube 153 that has an inlet end 160 with a first diameter. Between inlet end 160 and mounting surface 163, the flow tube 153 includes a conically expanding portion 162. At mounting surface 163, the flow tube 153 has a substantially constant diameter within which heater 154 is mounted by attaching, i.e., vis-a-vis welds, the legs 156-159 to the mounting surface 163. The terminals 165 and 161 are mounted in place in a manner similar to terminals 18 and 20 above in FIG. 2. Between mounting surface 163 and outlet end 166, the flow tube 153 has a conically decreasing-radius section 164. The inlet 160 and outlet 166 are sized to engage down pipe 150 and converter inlet 168, respectively, in a known manner. One known manner of sizing includes spin forming the ends of a tubular blank having a starting radius equal to the radius at the mounting section 163. The sizing of at least one of the ends of flow tube 153 does not take place until the heater 154 is welded in place.

In an alternative structure, the flow tube 153 may comprise two tubes portions welded together, the first portion including the inlet end 160 and the second portion including the outlet end 166. The heater is attached to the mounting surface 163, which is part of one of the tube portions, before the two tube portions are welded together.

While inlet 160 and outlet 166 are shown having the same diameter, this need not be the case and outlet 166 may be implemented with a diameter greater than or less than that of inlet 160.

The heater assembly 152 can be attached to down pipe 150 and to converter 170 either by welding or by clamping as is known to those skilled in the art. Additionally, to facilitate mounting, flanges such as shown in FIGS. 1, 2 and 3 can be welded to the tubular housing and to the down pipe and converter inlet.

According to this invention, means for attachment to a conventional catalytic converter inlet is defined as either (a) a flange having a planar surface for mounting to a complementary flange on the catalytic converter inlet or (b) a tube end suitable for either welding or clamping to a mating tube at the catalytic converter inlet.

Figure 6:
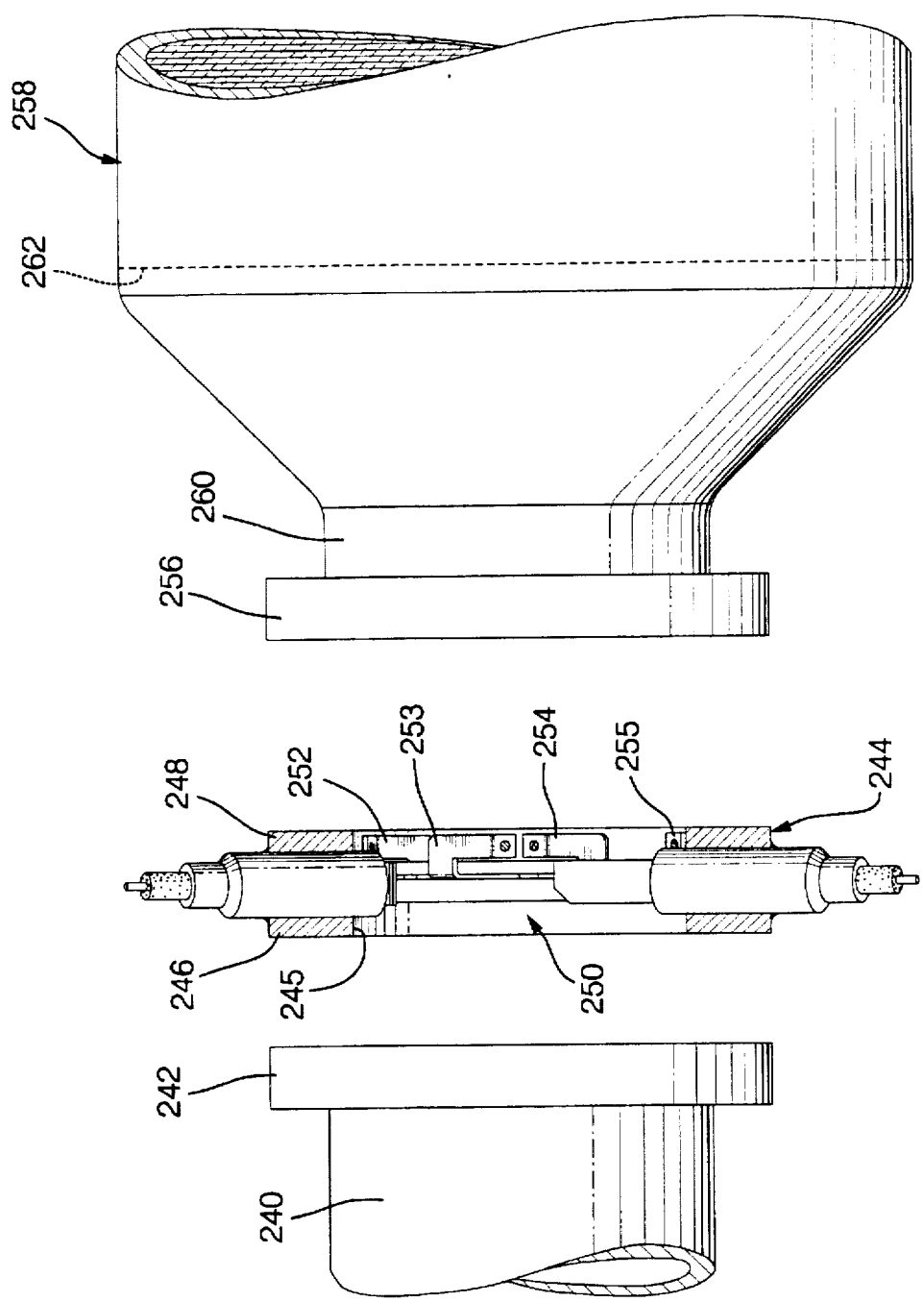
FIG. 6 illustrates yet another alternative example configuration for a catalyst heater assembly according to this invention.

Referring now to FIG. 6, the schematic shown includes heater assembly 244 in another example configuration according to this invention. The down pipe 240 has a flange 242 welded thereon that is normally engageable with flange 256 attached to the inlet 260 of catalytic converter 258. As a modification to provide the benefits of an electric heater according to this invention, the heater assembly 244 is provided consisting of two flange plates 246 and 248 welded together (or, alternatively, a single flange plate may be used) and defining a flow passage 245 within which the legs 252-255 of heater 250 are welded, maintaining the heater 250 in place within flow passage 245.

The heater unit is easily assembled into the system by placing the unit 244 between the flange plates 242 and 256. While the heater 250 is substantially upstream of the front surface 262 of the converter catalyst, it operates as the other heater examples described herein to quickly bring the converter catalyst up to light-off temperature after engine start-up.

Figure 7:
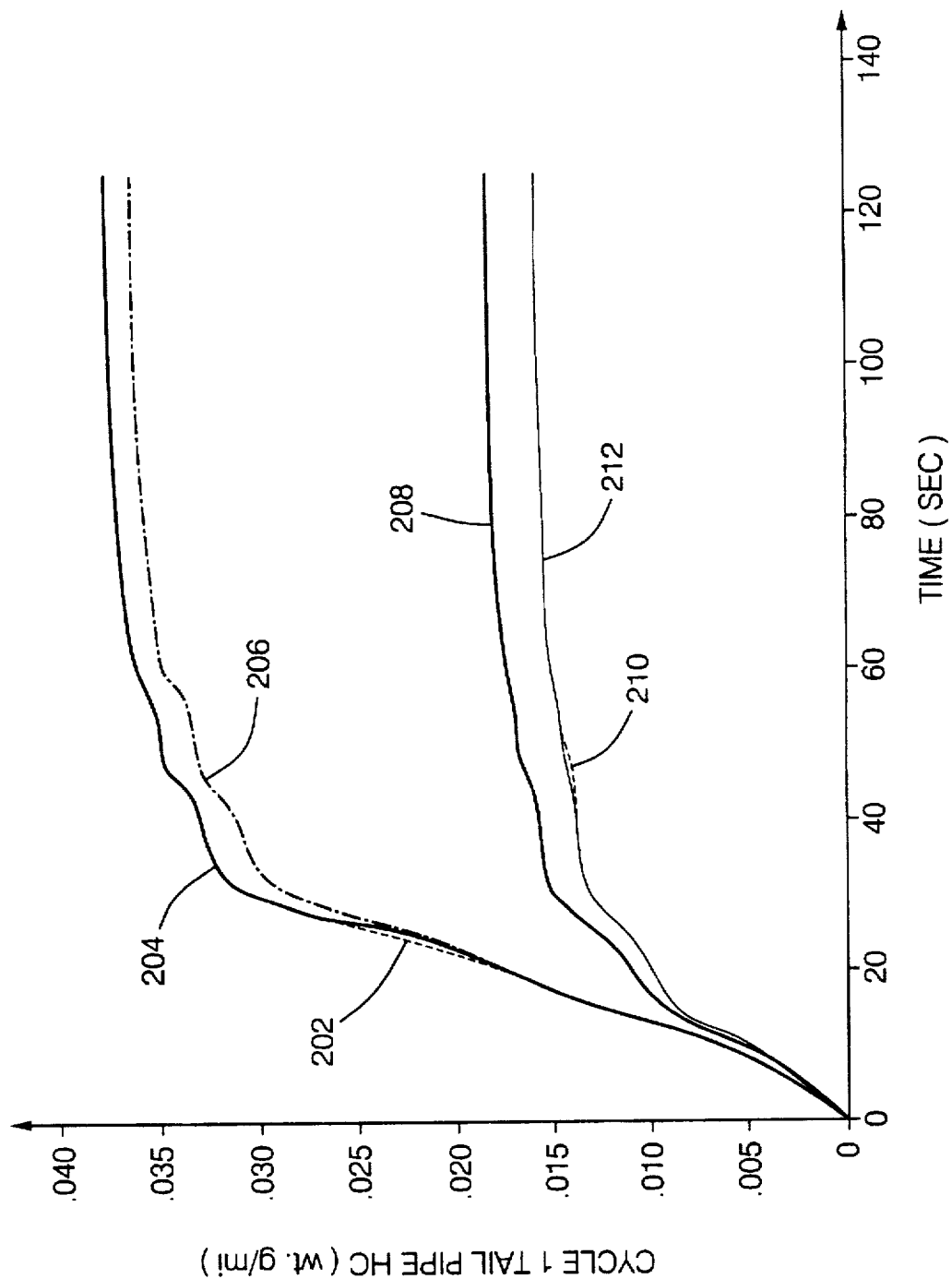
FIG. 7 is a graph showing the advantageous results of the exhaust management system according to this invention.

Referring now to FIG. 7, the graph shown compares the performances of a catalytic converter without an electric heater, a catalytic converter with an electric heater integrated into the converter as is known in the prior art and a catalytic converter with an electric heater mounted upstream and exterior of the converter, more than two inches away from the front surface of the converter catalyst. The graph shows the cumulative, over time, tailpipe HC output in weighted grams per mile for a sixteen valve four cylinder test engine.

Traces 202, 204 and 206 illustrate the HC output over time using a conventional catalytic converter with a cascaded catalyst configuration and having no electric heater. Trace 208 illustrates the HC output of a cascaded catalytic converter having, integrated therein, an electric heater placed within one inch of a single catalyst in a manner known to those skilled in the art. As can be seen, the electric heater placed close to the catalyst greatly reduces the cumulative HC output. This is due to the fact that the front end of the catalyst receives heat transferred from the heater to the exhaust gas flowing through the heater and as a result reaches light-off temperature faster than the prior art catalytic converters represented by traces 202, 204 and 206.

Traces 210 and 212 illustrate the performance of the catalytic converter in two example systems using the remote-mounted heater assembly according to this invention. As can be seen, the system incorporating this invention, represented by the traces 210 and 212, like the trace 208, reflect a drastically lower cumulative HC emission level than the system without the electric heater (traces 202, 204 and 206). The results reflected by traces 210 and 212 are achieved even though the heater is more than two inches upstream of the front surface of the catalyst and is located in a remote assembly, exterior of the catalytic converter.

According to this invention, the successful heating of the converter catalyst does not rely heavily on radiant heat transfer from the heater to the catalyst. Instead heat is transferred to the flow of exhaust gas through the heater and then, downstream of the heater, from the exhaust gas to the catalyst. This invention recognizes that, in the engine exhaust management system, the flow of exhaust gas is relatively rapid and the exhaust gas is the primary agent for transferring heat from the heater to the catalyst. Since the exhaust gas flows directly from the heater to the catalyst and is trapped within the flow passages without other intervening structures, the space between the heater and catalyst can be lengthened according to this invention without significantly reducing the efficiency of the operation of the electric heater in quickly bringing the catalyst up to light-off temperature.

Thus, the need to redesign the catalytic converter to include the heater within the converter is eliminated by this invention while the beneficial performance of the electric heater is maintained by the provision of the remote-mounted heater assembly.

We claim:

1. An exhaust management system comprising:
   a catalytic converter having a catalyst operative to reduce HC emissions from a flow of exhaust gas from an automotive internal combustion engine when the catalyst is above a light-off temperature;
   a heater assembly mounted in the flow of exhaust gas, upstream of the catalyst and exterior of the catalytic converter, wherein the heater assembly includes an electric heater located at least two inches from a front surface of the catalyst, wherein no catalyst substrates are included within the heater assembly or between the electric heater and the front surface of the catalyst, wherein the electric heater includes a heated flow director for transferring heat to the flow of exhaust gas flowing through the flow director and wherein the heater assembly includes a tubular flow passage having an inlet end and an outlet end, wherein the tubular flow passage has a first diameter at the inlet end, a conical expanding section downstream of the inlet end and a constant radius section between the conical expanding section and the outlet end, wherein the heater assembly includes a flange plate welded to the outlet end defining a cylindrical opening, wherein the electric heater includes a plurality of legs welded to a periphery of the opening and wherein the electric heater is suspended substantially upstream of the flange plate within the tubular flow passage.

2. An exhaust management system comprising:

a catalytic converter having a catalyst operative to reduce HC emissions from a flow of exhaust gas from an automotive internal combustion engine when the catalyst is above a light-off temperature;

a heater assembly mounted in the flow of exhaust gas, upstream of the catalyst and exterior of the catalytic converter, wherein the heater assembly includes an electric heater located at least two inches from a front surface of the catalyst, wherein no catalyst substrates are included within the heater assembly or between the electric heater and the front surface of the catalyst, wherein the electric heater includes a heated flow director for transferring heat to the flow of exhaust gas flowing through the flow director and wherein the heater assembly comprises a housing defining a flow passage within which the electric heater is mounted and a mounting flange at the outlet end of the housing having a planar surface perpendicular to an axis of the flow passage.

3. An exhaust management system comprising:

a catalytic converter having a catalyst operative to reduce HC emissions from a flow of exhaust gas from an automotive internal combustion engine when the catalyst is above a light-off temperature;

a heater assembly mounted in the flow of exhaust gas, upstream of the catalyst and exterior of the catalytic converter, wherein the heater assembly includes an electric heater located at least two inches from a front surface of the catalyst, wherein no catalyst substrates are included within the heater assembly or between the electric heater and the front surface of the catalyst, wherein the electric heater comprises a heated flow director for transferring heat to the flow of exhaust gas flowing through the flow director and wherein the electric heater comprises a housing defining a tubular flow passage having an inlet end, an outlet end, an inner tubular wall and a mounting section on the inner tubular wall between the first and second ends, wherein the inner tubular wall has a first diameter at the mounting section and a conical section between the mounting section and the inlet end, wherein the inlet end of the tubular wall has a second diameter unequal to the first diameter at the mounting section, wherein the outlet end includes means for attachment to a conventional catalytic converter inlet.

4. An exhaust management system according to claim 3, wherein the means for attachment comprises a mounting flange welded to the outlet end of the housing and including a planar surface perpendicular to a flow axis of the tubular flow passage.

5. An exhaust management system according to claim 4, wherein the mounting flange includes an opening at the outlet of the housing, wherein the electric heater comprises a plurality of legs fixedly attached to a peripheral wall of the opening.

6. An exhaust management system according to claim 5, wherein the electric heater is positioned axially upstream of the opening.

* * * * *